United States Patent [19]

Sandvik

[11] Patent Number: 5,419,705
[45] Date of Patent: May 30, 1995

[54] TALKING BOOK WITH REMOVABLE SOUND SOURCE

[75] Inventor: Sigurd Sandvik, Sola, Norway

[73] Assignee: Sandviks Bokforlag, Norway

[21] Appl. No.: 105,727

[22] Filed: Aug. 11, 1993

[51] Int. Cl.6 .............................................. G09B 5/06
[52] U.S. Cl. .................................................. 434/317
[58] Field of Search ............... 434/317, 309, 312, 311, 434/308; 446/397, 147

[56] References Cited

U.S. PATENT DOCUMENTS

| | | | |
|---|---|---|---|
| 4,245,404 | 1/1981 | Yoshinari | 434/312 |
| 4,752,230 | 6/1988 | Shimizu | 434/317 |
| 4,884,974 | 12/1989 | DeSmet | 434/317 |
| 4,990,092 | 2/1991 | Cummings | 434/317 |
| 4,997,374 | 3/1991 | Simone | 434/317 |
| 5,167,508 | 12/1992 | McTaggart | 434/317 |

FOREIGN PATENT DOCUMENTS 2024480  1/1980  United Kingdom ................ 434/317

*Primary Examiner*—Gene Mancene
*Assistant Examiner*—Jeffrey A. Smith
*Attorney, Agent, or Firm*—Seidel Gonda Lavorgna Monaco

[57] ABSTRACT

A talking book includes front and back covers and a plurality of individual leaves therebetween. The covers and leaves contain literal and graphic indicia thereon describing and illustrating at least one character, object or event. At least one sound source is removably attached to the book for producing sound corresponding to at least a selected one of the characters, objects and events illustrated and described in the book. The sound source includes at least one switch thereon for causing the production of sound in response to actuation of the switch. The switch is uniquely labelled to correspond to a selected one of the characters, objects or events.

14 Claims, 6 Drawing Sheets

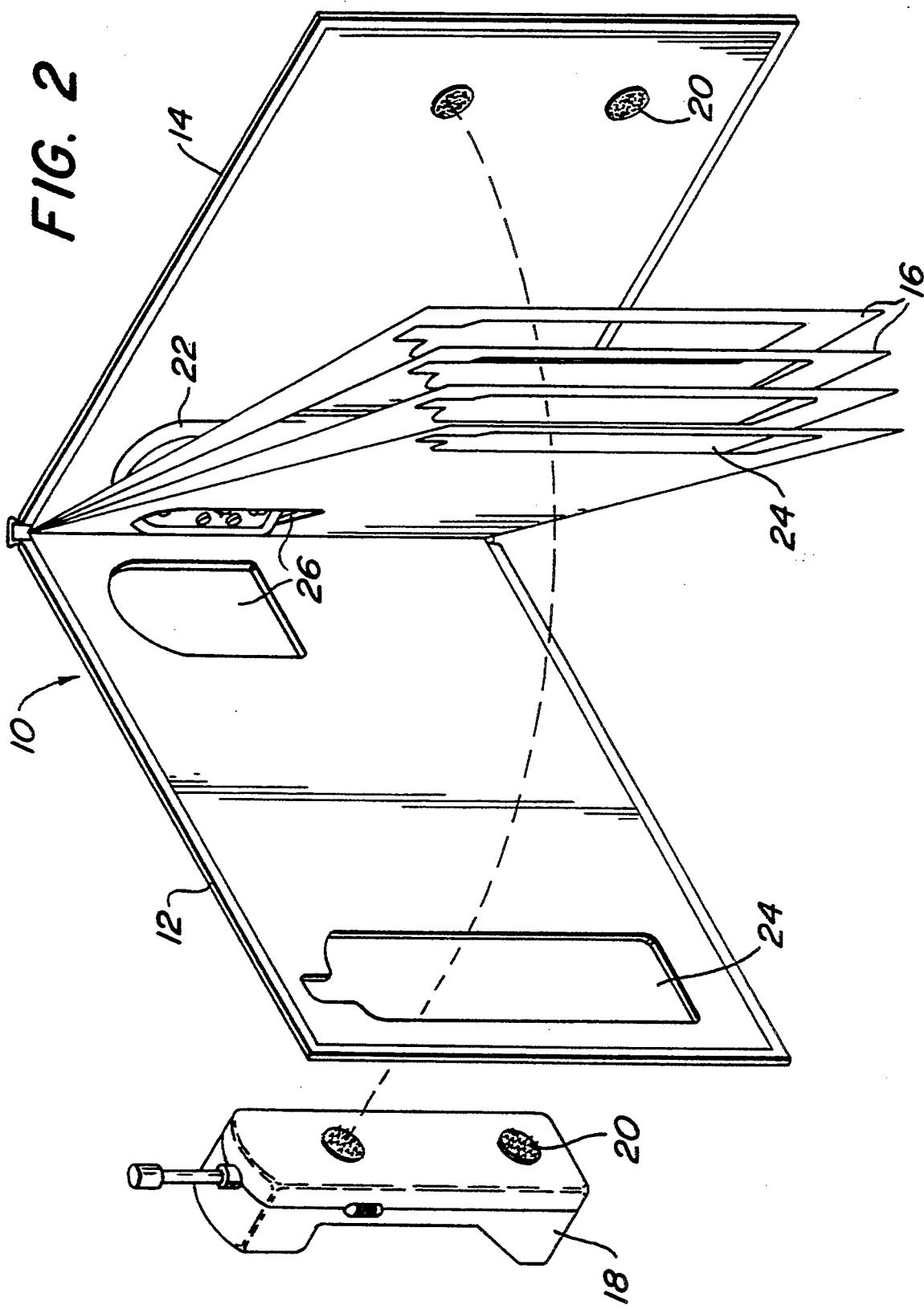

FIG. 4
FIG. 5
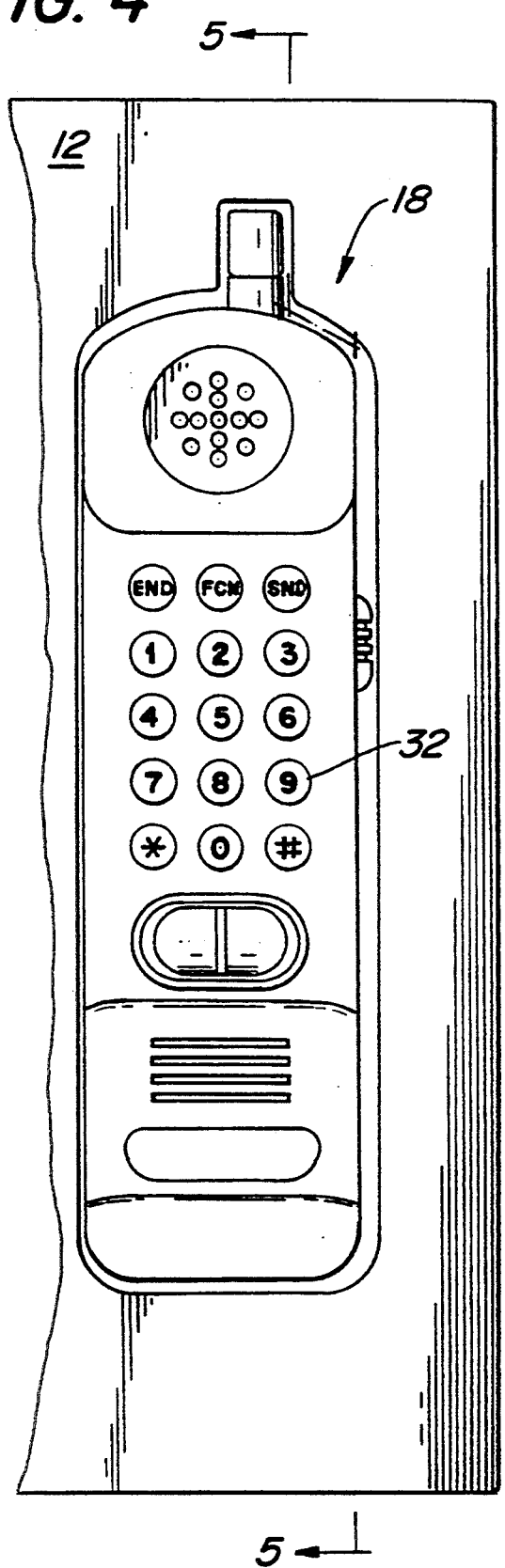
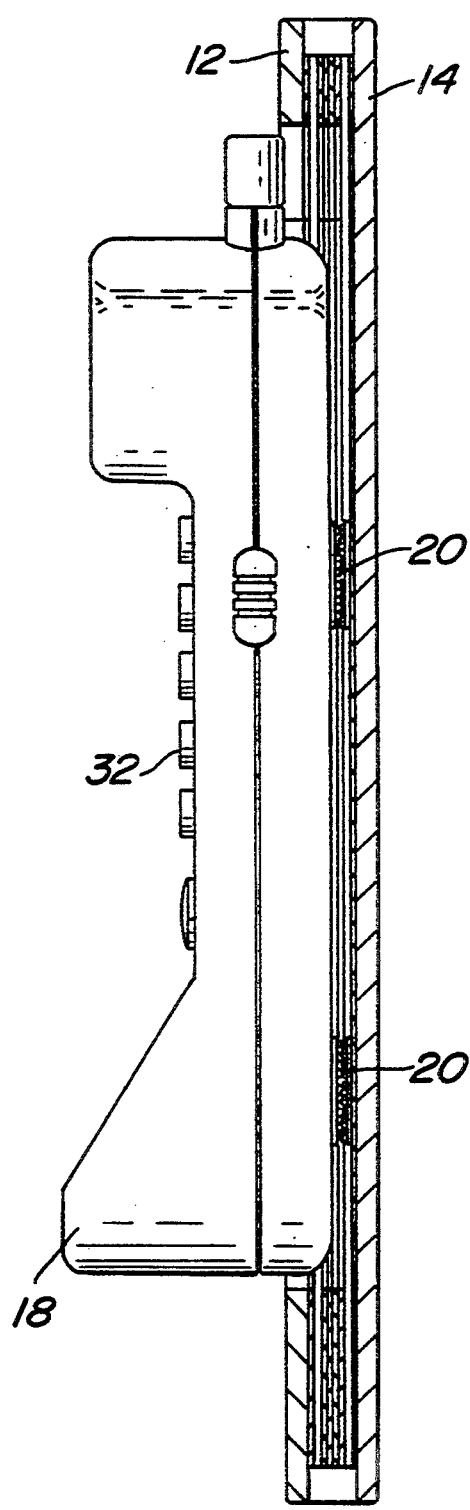

TALKING BOOK WITH REMOVABLE SOUND SOURCE

FIELD OF THE INVENTION

The present invention relates to "talking" books, particularly children's books which contain words and pictures and which include a sound source for producing sounds related to the words and pictures.

BACKGROUND OF THE INVENTION

Talking books are known, and are a popular item for children, especially young children who are learning or have just learned to read. Typically, a talking book has an integral sound source for producing sounds when actuated by the reader. Such sound sources may be mechanical, such as a bellows-actuated reed or whistle, or may be electronic, in which sounds are stored digitally and reproduced electronically. The sound source, whatever its structure, is usually keyed to the story in the book, so that the sounds produced bear some relationship to the content of the story. The sound source is not only keyed to the story, it is physically incorporated into the book so as to become a permanent part of the book. That is, the sound source is not removable from the book. While these books are enjoyable and educational for the child, they are limited in that they are unable to provide a more active role for the child to play when reading the book or having it read to him or her.

A child's interest and imagination, and hence the play value and educational value of a book, are enhanced when the child is able to take a more active role in reading or listening to the book. To provide a more enjoyable and more educational reading experience, it is desired to provide a talking book with a sound source that is keyed to the story in the book but is removably attached to the book so that the sound source can, on occasion, be separated by the reader from the book. The sound source preferably produces realistic sounds, such as sounds of objects, or events, or of animals or human speech. This gives a talking book a greater play value and greater educational value. By permitting the sound source to be removed when desired, a reader, particularly a young child, can more actively and more realistically act out the story along with the characters in the book. This gives the child a greater feeling of participation in the reading process, and stimulates the child's interest in reading.

In particular, it is desired to provide a removable sound source in the shape of a telephone handset, such as a cordless telephone, by which a young reader can pretend to be engaged in conversation with one of the characters in the story. Children are naturally curious about and interested in the telephone, and it is desired to provide the experience of using the telephone in the context of a pleasant story. This enables the child reader to get more out of the story, and provides the child with an enjoyable and educational simulated telephone experience at the same time.

Prior attempts to provide this type of experience to a child reader have been made, but have fallen short. For example, U.S. Pat. Nos. 4,642,054 and 4,752,230 both illustrate books including telephone dials or keypads, but not a telephone handset. In U.S. Pat. No. 4,642,054, the telephone dial does not reproduce any sounds, nor is it removable from the book. The book illustrated in that patent therefore cannot provide a realistic telephone experience for a child reader. In U.S. Pat. No. 4,752,230, the book includes a simulated telephone keypad which actuates a sound generator to produce musical sounds according to instructions in the book. The book illustrated in that patent enables a reader to reproduce simple melodies by pressing the number keys on the keypad according to numerical sequences printed in the book. While the keypad illustrated in this patent imitates a telephone keypad, it is really not part of a simulated telephone at all.

The present invention provides a unique form of talking book which provides a realistic telephone experience for a child in conjunction with a pleasantly entertaining or educational story by providing a removable simulated telephone handset which produces sounds keyed to the story in the book. A child reader can readily imagine that he or she is participating in a conversation with one or more characters in the book and is actually listening to the voices of the characters on the telephone. Even children who have not yet learned to read can enjoy the book of the present invention. One or more keys on the simulated telephone handset can be labelled with a picture or icon representing a character or object. The child can simply press the key with the picture or icon representing the character or object to hear the sounds associated with that character or object.

It is accordingly an object of the present invention to provide a talking book with a removable sound source that provides a more enjoyable, more stimulating and more educational reading experience for a child.

SUMMARY OF THE INVENTION

The present invention is directed to a talking book comprising front and back covers and a plurality of individual leaves therebetween. The covers and the leaves contain literal and graphic indicia thereon describing and illustrating at least one character, object or event. At least one sound source is removably attached to the book for producing sound corresponding to at least a selected one of the characters, objects or events illustrated and described in the book. The sound source includes at least one switch means thereon for causing the production of sound in response to actuation of the switch means. The switch means is uniquely labelled to correspond to a selected one of the characters, objects or events.

DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 2 is an exploded view of the book shown in FIG. 1, showing the telephone handset removed from the book and showing the book partially open.

FIG. 4 is a fragmentary view of a portion of the book shown in FIG. 1, illustrating one form of telephone handset.

FIG. 5 is a partial sectional view taken along the lines 5—5 in FIG. 4.

DESCRIPTION OF THE INVENTION

Figure 1:
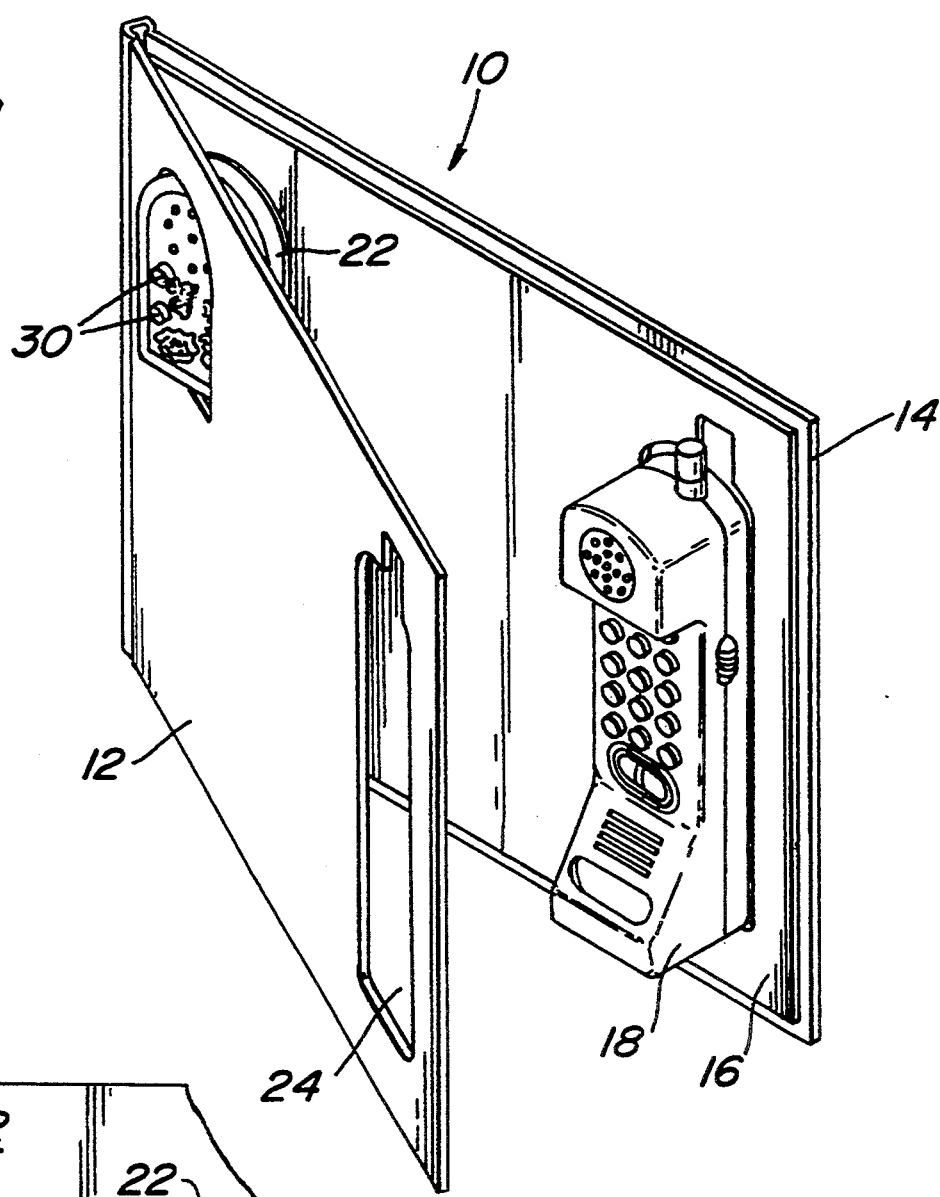
FIG. 1 is an isometric view of a talking book according to the present invention, having both a fixed sound source and a removable sound source in the form of a telephone handset.

Referring now to the drawings, wherein like numerals indicate like elements, there is shown in FIGS. 1 and 2 a talking book 10 according to the present invention. Book 10 comprises front and back covers 12 and 14, respectively, between which are bound individual leaves 16, in conventional fashion.

Covers 12 and 14 and leaves 16 contain literal and graphic indicia, i.e., words and pictures, which tell a story. For the sake of clarity, the literal and graphic indicia have been omitted from the drawings.

Book 10 further comprises a removable sound source 30 in the form of a toy telephone handset 18. Telephone 18 is removably attached to the inside of back cover 14, preferably by hook and loop fasteners 20, such as sold commercially under the trademark VELCRO. In the embodiment illustrated in FIGS. 1 and 2, book 10 also includes a stationary sound source 22 which is fixedly attached to the inside of back cover 14. Preferably, although not necessarily, front cover 12 and leaves 16 are provided with a plurality of openings 24 and 26, respectively, through which telephone 18 and stationary sound source 22 extend. In that manner, telephone 18 and stationary sound source 22 are accessible even when the book is closed, or are accessible from any page in book 10 when book 10 is partially open.

Figure 3:
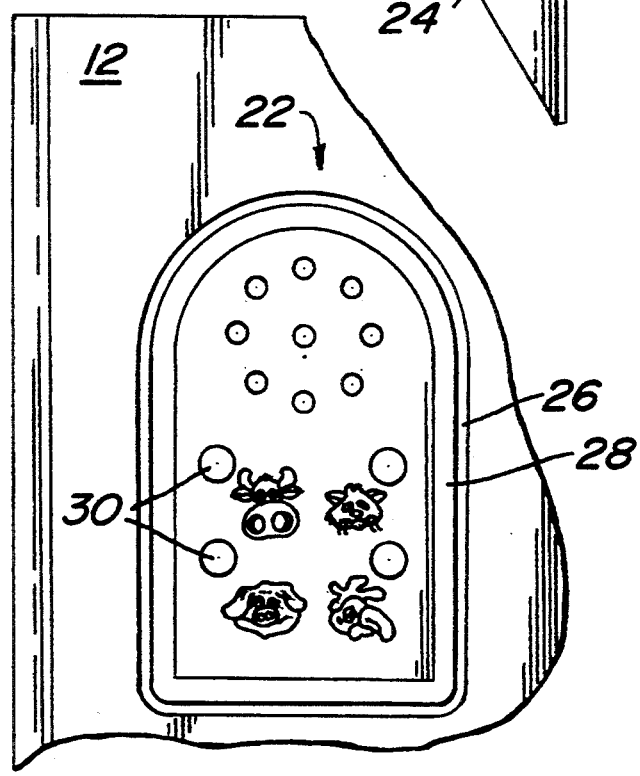
FIG. 3 is a fragmentary view of a portion of the book shown in FIG. 1, illustrating the fixed sound source in greater detail.

As seen more clearly in FIG. 3, stationary sound source 22 comprises a housing 28 within which is contained a sound source (not shown). The sound source is preferably an electronic sound source, in which at least one sound (and preferably a plurality of sounds) is stored and reproduced upon actuation of one or more switches. The precise form and structure of the particular sound source are immaterial to the present invention and, therefore, are not described in detail. It is sufficient to note that stationary sound source 22 has a plurality of keys 30 which are associated with switches for selecting a desired sound to be produced by sound source 22. In the illustrated embodiment, there are four keys. Each key has associated with it an icon representative of a particular animal, such as a cow, cat, pig, and rooster. For example, book 10 may contain a story about a farm in which a cow, a cat, a pig and a rooster are featured characters. Sound source 22 may produce a "moo" sound when the key associated with the cow icon is depressed, a "meow" sound when the key associated with the cat icon is pressed, and so forth. Alternatively, instead of animal sounds, sounds of human speech may be produced when a key 30 is pressed. For example, when the key associated with the cow icon is pressed, sound source 22 may produce a word or phrase uttered by the cow character in the story. Each character can be given its own unique voice, so that the speech sounds associated with a given character are produced in a different voice.

As a further alternative, sound source 22 can be configured to reproduce sounds of objects instead of characters. For example, book 10 may contain a story about fire fighters, and sound source 22 may produce sounds of a fire alarm, the siren of a fire engine, a fire bell, and the like.

In the embodiment illustrated in FIGS. 1 and 2, telephone 18 may be programmed with different sounds correlated to the story in book 10. For example, telephone 18 may be configured with a keypad just as a real telephone, with numbers from 0 through 9, and symbols such as "*", and "#". Each key may have associated with it a unique sequence of sounds correlated to the story. For example, if book 10 contains a story about a farm, the key numbered "1" may produce the voice of the farmer, the key numbered "2" may produce musical tones of an appropriate melody such as "The Farmer In The Dell" and so forth. As with stationary sound source 22, telephone 18 can contain any suitable sound source actuated by keypad 32 on telephone 18.

Preferably, although not necessarily, the story in book 10 includes both literal and graphic cues to indicate to the reader when particular keys 30 on sound source 22, or on keypad 32, should be pressed. In that way, a child reading the book, or a child listening to the book being read, will be guided to press the appropriate button to produce sounds at the appropriate place in the story.

By being able to remove telephone 18 from book 10, the child can enjoy a more realistic, and therefore more educational, telephone experience. With appropriate programming, telephone 18 can enable a child to enjoy a simulated conversation with a character in the book. For example, telephone 18 can reproduce words and phrases separated by pauses, during which the child can respond. Thus, for example, a character could "ask" the child a series of questions, separated by pauses during which the child answers the questions. This enables a child, particularly a very young child, to feel as though he or she is actually participating in the story.

Telephone 18 can also be programmed with sounds related to the story but not directly keyed to the text. For example, certain keys in keypad 32 can be programmed to ask a child questions to test the child's recall of what the child read or heard. In that way, book 10 becomes a valuable teaching tool. Alternatively, a series of questions, for example, nine questions corresponding to keys numbered 1 through 9 on keypad 32, can be printed at the end of the story, and answers can be stored in telephone 18. The child can answer the questions orally, and then check the answers by pressing the key on keypad 32 corresponding to the number of the question.

As those skilled in the art will appreciate, the combinations and possibilities for coordinating telephone 18 and stationary sound source 22 with the story in book 10 are virtually limitless.

A unique feature of the invention is that telephone 18 is easily removable from book 10 whether book 10 is open or closed, and no matter what page book 10 may be opened to. This makes it easy for children, particularly small children, to remove telephone 18 without having to open book 10. Although it is preferred that openings 24 and 26 be provided for access to telephone 18 and sound source 22, that feature of the invention is not necessary. If desired, telephone 18 and sound source 22 may be mounted on the outside of one of covers 12 or 14, or in other locations on book 10.

Figure 6:
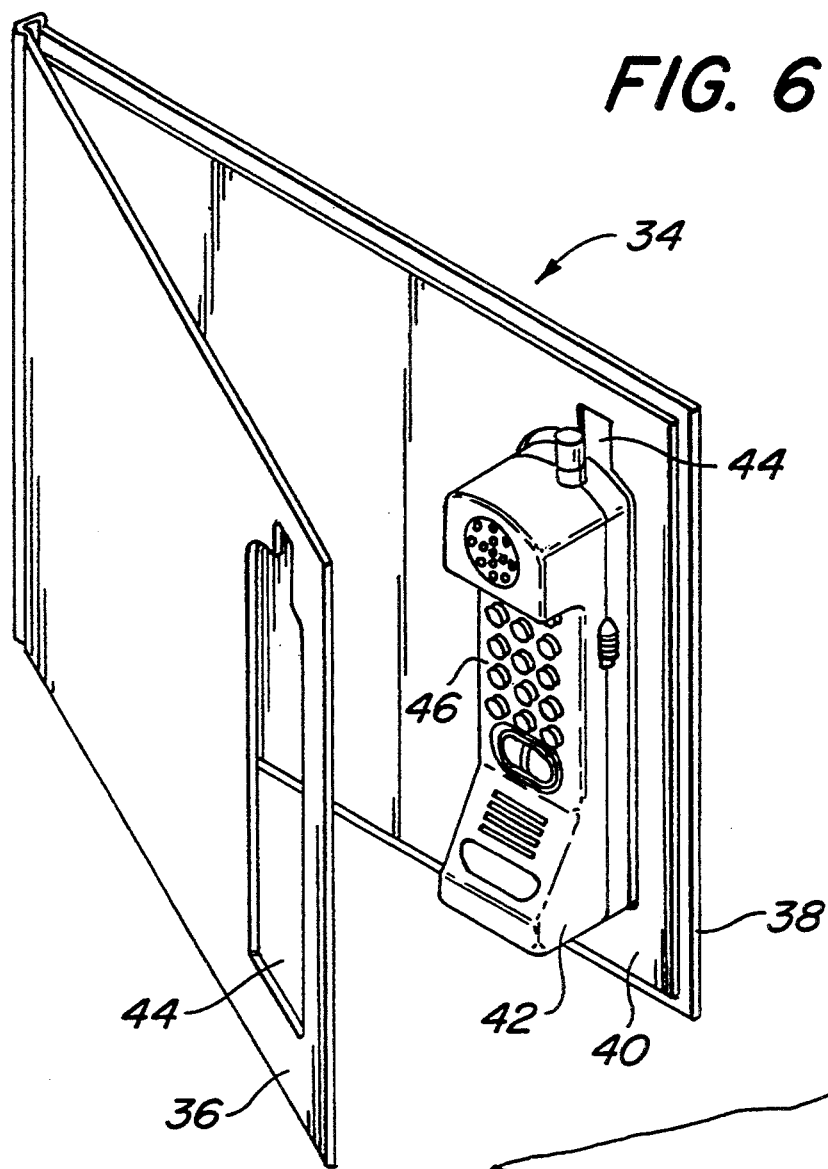
FIG. 6 is an isometric view of a talking book according to a second embodiment of the invention.
Figure 7:
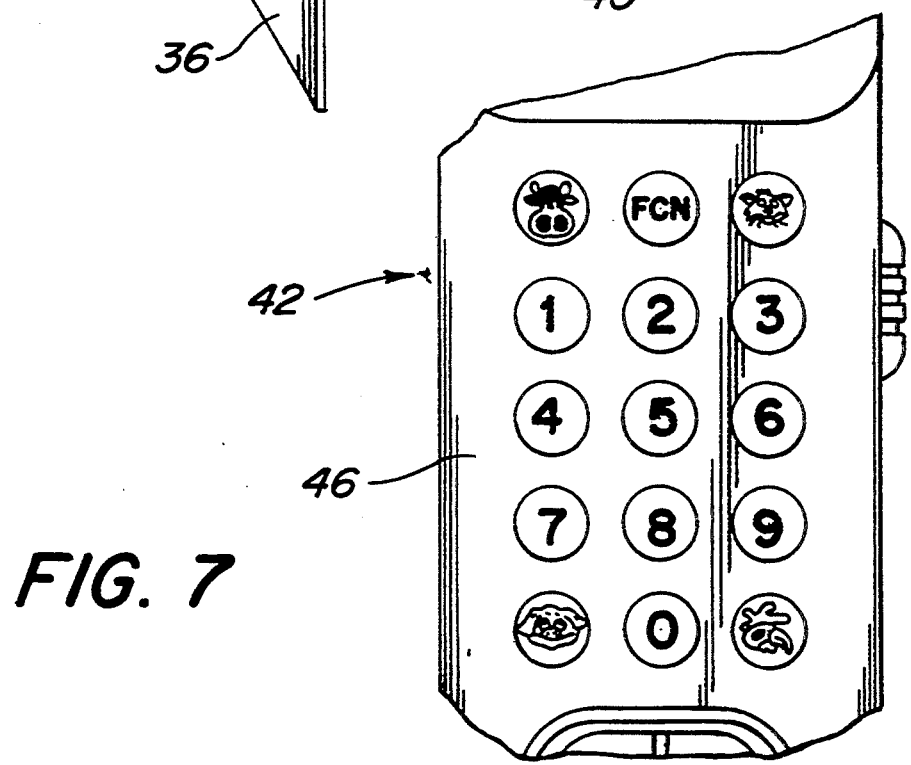
FIG. 7 is a fragmentary view of the keypad of the telephone handset according to the second embodiment.
Figure 8:
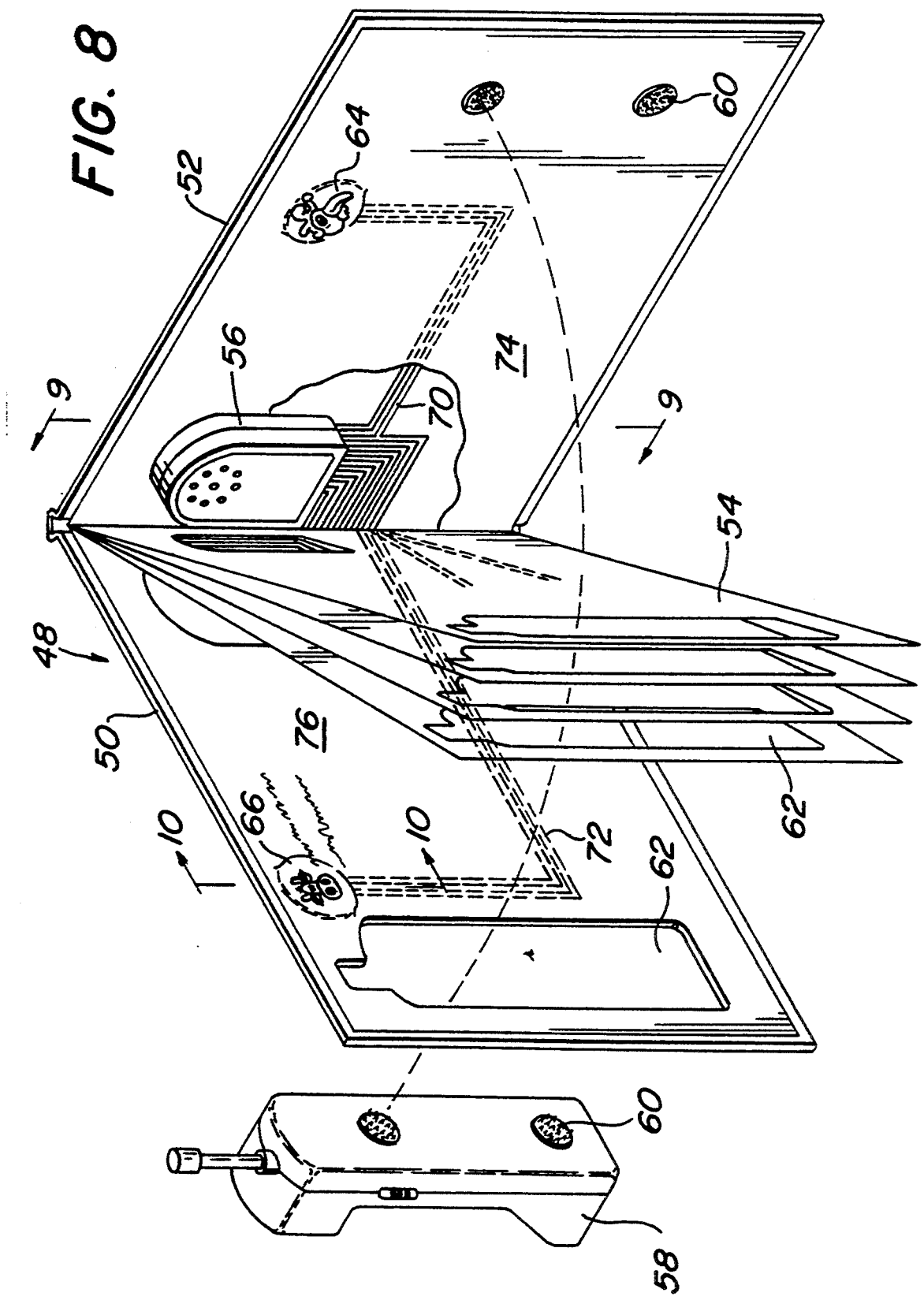
FIG. 8 is an exploded view of a talking book according to a third embodiment of the invention.

A second embodiment of the invention is illustrated in FIG. 6. In that embodiment, book 34 comprises front and back covers 36 and 38 and individual leaves 40, as before, with a removable telephone sound source 42 removably attached to the inside of back cover 38 and accessible through openings 44 in front cover 36 and leaves 40. However, book 34 does not contain a stationary sound source. Instead, all of the sounds are produced by telephone sound source 42. Telephone sound source 42 may have a keypad 46 which contains not only numeric keys but, instead of keys such as "*" and "#" found on conventional keypads, may include keys bearing icons of characters or objects in the story. Thus, as best seen in FIG. 7, keypads 46 may contain icons representative of a cow, a cat, a pig and a rooster, as well as numeric keys from 0 through 9. Telephone sound source 42 may be constructed to produce any desired sounds.

A third embodiment of the invention is illustrated in FIGS. 8 through 11. In the third embodiment, book 48 comprises, as before, front cover 50, back cover 52 and a plurality of individual leaves 54. Book 52 also contains a stationary sound source 56 and a telephone sound source 58 removably attached to the inside of back cover 52 by hook and loop fasteners 60. Telephone sound source 58 may have either of the configurations described previously with respect to the first two embodiments of the invention. Likewise, a plurality of openings 62 are provided in front cover 50 and leaves 54 to provide access to telephone sound source 58.

Figure 9:
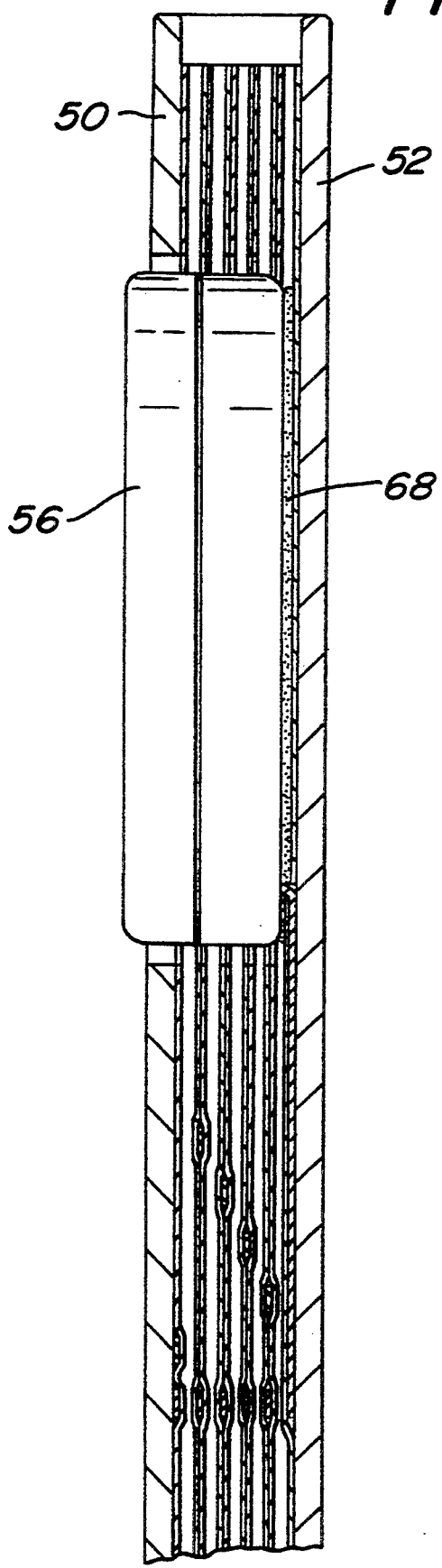
FIG. 9 is a partial sectional view taken along the lines 9—9 in FIG. 8.

In the third embodiment, the switches which actuate sound source 56 are distributed throughout book 48, rather than being located on sound source 56 itself. For example, a switch 64 associated with the character of a rooster may be located in the inside of back cover 52, along with text or graphics describing the rooster character. Sound source 56 produces the sound associated with the rooster character when switch 64 is actuated. In like manner, a switch 66 associated with the character of a cow may be provided on front cover 50, in conjunction with text or graphics describing the cow character. When switch 66 is pressed, sound source 56 produces sounds associated with the cow character. As illustrated in FIG. 9, sound source 56 is fixed to the inside of back cover 52 such as by an adhesive layer 68.

A plurality of electrical leads associated with each individual switch, such as leads 70 and 72 associated with switches 64 and 66, are provided and are preferably covered by sheets such as sheets 74 and 76 so as not to be visible or accessible to the reader. Thus, as illustrated in the figure, leads 70 and 72 associated with switches 64 and 66, respectively, are sandwiched between back cover 52 and sheet 74, and front cover 50 and sheet 76, respectively. Likewise, individual switches may be located on individual leaves 54. In that case, each of individual leaves 54 would comprise two sheets with the electrical leads for the switches therebetween.

Figure 10:
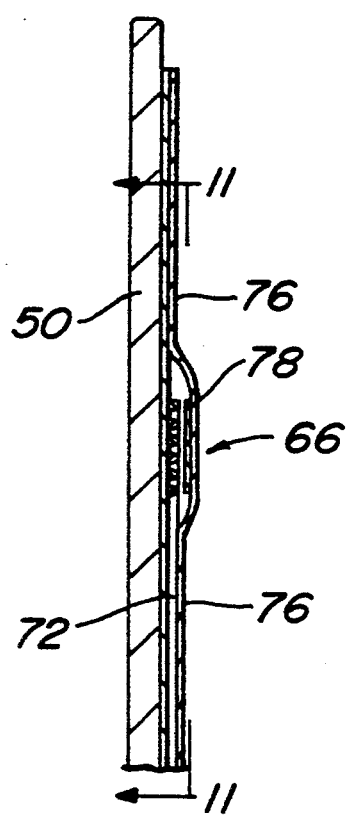
FIG. 10 is a partial sectional view taken along the lines 10—10 in FIG. 8, showing a type of actuating key for the fixed sound source.
Figure 11:
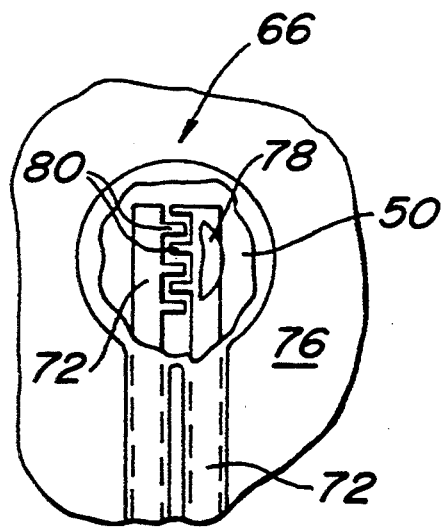
FIG. 11 is a view of the key taken along the lines 11—11 in FIG. 10, with the key partially broken away to illustrate the internal structure of the key.

Details of one form of switch 66 are illustrated in FIGS. 10 and 11. FIGS. 10 and 11 illustrate the placement of electrical leads 72 between sheet 76 and front cover 50. FIGS. 10 and 11 also illustrate switch contact 78. Switch contact member 78 bridges interdigitated contact fingers 80 on leads 72 to selectably close switch 66. Alternatively, other forms of low profile switches, such as membrane switches and so forth, may be used without departing from the invention.

The present invention may be embodied in other specific forms without departing from the spirit or essential attributes thereof and, accordingly, reference should be made to the appended claims, rather than to the foregoing specification, as indicating the scope of the invention.

I claim:

1. A talking book comprising front and back covers and a plurality of individual leaves therebetween, said covers and said leaves containing literal and graphic indicia thereon describing and illustrating at least one character, object or event, at least one sound source removably attached to said book for producing sound corresponding to at least a selected one of said character, object and event illustrated and described in said book, said sound source comprising means operative for producing said sound both when attached to and detached from said book, said sound source including at least one switch means thereon for causing the production of sound in response to actuation of said switch means, said switch means being uniquely labelled to correspond to a selected one of said character, object or event.

2. A talking book as in claim 1, further comprising a second sound source fixed to said book.

3. A talking book as in claim 2, said second sound source including at least one switch means connected thereto for causing the production of sound in response to actuation of said switch means, said switch means being uniquely labelled to correspond to a selected one of said character, object and event.

4. A talking book as in claim 2, wherein the removable sound source and the second sound source are electronic sound sources.

5. A talking book as in claim 1, wherein the removable sound source comprises a simulated telephone handset.

6. A talking book as in claim 5, wherein said sound source includes a plurality of switch means arranged as in a telephone keypad.

7. A talking book as in claim 6, wherein each switch means is uniquely labelled to correspond to a selected one of a plurality of characters, objects or events.

8. A talking book comprising literal and graphic indicia therein describing and illustrating a story, at least one sound source removably attached to said book for producing sound corresponding to a selected character, object or event in said story, said sound source furthermore comprising means operative for producing said sound when detached from said book, said sound source including at least one switch means thereon for causing the production of sound in response to actuation of said switch means, said switch means being uniquely labelled to correspond to a selected one of said character, object and event, said book including literal and graphic cues for directing a reader to actuate said at least one switch means at preselected points in the story.

9. A talking book as in claim 8, further comprising a second sound source fixed to said book, said second sound source including switch means connected thereto for causing the production of sound in response to actuation of said switch means, said switch means being uniquely labelled to correspond to a selected one of said character, object or event.

10. A talking book as in claim 8, wherein the removable sound source comprises a simulated telephone handset having a plurality of switch means arranged as in a telephone keypad.

11. A talking book as in claim 10, wherein each switch means is uniquely labelled to correspond to a selected one of a plurality of characters, objects or events.

12. A talking book comprising front and back covers and a plurality individual leaves therebetween, said covers and said leaves containing literal and graphic indicia thereon describing and illustrating at least one character, object or event, at least one sound source removably attached to said book for producing sound corresponding to at least a selected one of said character, object and event illustrated and described in said book, said sound source comprising means operative for producing said sound both when attached to and detached from said book, said sound source including at least one switch means thereon for causing the production of sound in response to actuation of said switch means, said switch means being uniquely labelled to correspond to a selected one of said character, object or event, and wherein said front cover has an opening formed therein for permitting access to said sound source.

13. The combination of claim 12, wherein the removable sound source comprises a simulated telephone handset having a plurality of switch means arranged as in a telephone keypad.

14. A talking book comprising front and back covers and a plurality of individual leaves therebetween, said covers and said leaves containing literal and graphic indicia thereon describing and illustrating at least one character, object or event, at least one electronic sound source removably attached to said book for producing sound corresponding to at least a selected one of said character, object or event illustrated and described in said book, said removable sound source being in the form of a simulated telephone handset and having a plurality of switch means thereon arranged as in a telephone keypad for causing the production of sound in response to actuation of said switch means, said switch means being uniquely labelled to correspond to a selected one of said character, object or event, and a second electronic sound source fixed to said book, said second sound source including at least one switch means connected thereto for causing the production of sound in response to actuation of said switch means, said switch means connected to said second sound source being uniquely labelled to correspond to a selected one of said character, object or event.

* * * * *